(12) United States Patent
Martin

(10) Patent No.: US 12,246,989 B2
(45) Date of Patent: Mar. 11, 2025

(54) WATER REPELLENT COMPOSITION

(71) Applicant: ETEX BUILDING PERFORMANCE INTERNATIONAL SAS, Avignon (FR)

(72) Inventor: Daniel Martin, Vedène (FR)

(73) Assignee: ETEX BUILDING PERFORMANCE INTERNATIONAL SAS, Avignon (FR)

( * ) Notice: Subject to any disclaimer, the term of this patent is extended or adjusted under 35 U.S.C. 154(b) by 439 days.

(21) Appl. No.: 17/639,361

(22) PCT Filed: Sep. 2, 2020

(86) PCT No.: PCT/EP2020/074451
§ 371 (c)(1),
(2) Date: Mar. 1, 2022

(87) PCT Pub. No.: WO2021/043816
PCT Pub. Date: Mar. 11, 2021

(65) Prior Publication Data
US 2022/0298072 A1    Sep. 22, 2022

(30) Foreign Application Priority Data
Sep. 3, 2019 (EP) .................... 19195153

(51) Int. Cl.
*C04B 18/06* (2006.01)
*C04B 24/42* (2006.01)
*C04B 28/14* (2006.01)
*C04B 111/00* (2006.01)
*C04B 111/27* (2006.01)

(52) U.S. Cl.
CPC ............ *C04B 18/067* (2013.01); *C04B 24/42* (2013.01); *C04B 28/14* (2013.01); *C04B 2111/00672* (2013.01); *C04B 2111/27* (2013.01)

(58) Field of Classification Search
CPC ....... C04B 18/067; C04B 24/42; C04B 28/14; C04B 2111/00672; C04B 2111/27; Y02W 30/91
See application file for complete search history.

(56) References Cited

U.S. PATENT DOCUMENTS

| 3,751,926 A | 8/1973 | Mueller et al. |
| 5,273,581 A | 12/1993 | Koslowski et al. |
| 6,569,541 B1 | 5/2003 | Martin et al. |

FOREIGN PATENT DOCUMENTS

| DE | 59269 A | 12/1967 |
| DE | 3843625 A1 | 12/1989 |
| EP | 2089336 A1 | 8/2009 |
| SU | 1530597 A1 | 12/1989 |

OTHER PUBLICATIONS

Nevakshonov et al., "Composition for producing gypsum articles"; Chemical Abstracts; 112: Apr. 16, 1990; p. 336.
Schildbach, "A new water-repellent agent for gypsum-based drymix mortars," Zig International—ZEMENT—KALK—GIPS International, Bauverlag BV GMBH, DE, 67:2, pp. 58-64, Jul. 1, 2014.
Khalil et al., "Effect of some waste additives on the physical and mechanical properties of gypsum plaster composites," Construction and Building Materials, 68, pp. 580-586, Jul. 26, 2014.
Pundir et al., "Evaluation of properties of gypsum plaster-superplasticizer blends of improved performance," Journal of Building Engineering, 4, pp. 223-230, Oct. 1, 2015.

*Primary Examiner* — Anthony J Green
(74) *Attorney, Agent, or Firm* — Dilworth & Barrese, LLP

(57) ABSTRACT

A water repellent composition comprising slag and organosiliconate salt characterized in that the concentration of the slag is from 1-5 wt % based on the weight of the plaster and the concentration of organosiliconate salt is from 0.5-2 wt % based on the weight of the plaster.

14 Claims, 2 Drawing Sheets

WATER REPELLENT COMPOSITION

FIELD OF THE INVENTION

The present invention relates to a water repellent composition for calcium sulfate based products, a method for producing prefabricated structural element which is water resistant, in particular a plasterboard or a block, and the use of the water repellent composition as a jointing compound.

BACKGROUND

Prefabricated structural element material being water resistance are suitable for use in wet conditions such as in kitchens and bathrooms, or even outdoors.

The expression "suitable for use in wet conditions" should be understood to mean the ability of a structural element as defined above to limit the uptake of water by the plaster substrate, while still retaining the dimensional stability and mechanical integrity of the structural element in question.

Siloxanes which are capable of forming highly cross-linked silicone resins are widely used as water repellent agent.

EP1778457 or U.S. Pat. No. 5,135,805 describes the use of siloxane in slurry compositions to form plasterboard to improve the water resistance.

WO2017140784 describes the plasterboard for use in wet condition which may comprise a mixture of one or more polysiloxane water repellant agents, and one or more clay minerals.

U.S. Pat. No. 6,569,541 discloses the addition of mineral component to a silicone water-repellent agent in a plaster board to better control the water repellency and to improve the introduction and mixing of the water-repellent agent. Methyl Polymethyl Hydrogen siloxane (MPHS) combined preferably with a clay as mineral. MPHS is preferably added in water wherein the plaster is or sprayed over the plaster prior the addition of hydration water. It is indeed critical to avoid the formation of aggregates in the slurry.

Organosiliconate salts which are also water repellent agents, are used for in-plant water-repellent impregnation of heavy clay products such as roof tiles or floor tiles. Organosiliconate salts are more seldomly used with plaster as it is known that organosiliconate salts affect the setting time but also the hydration rate and the mechanical strength of a plasterboard as it can be observed in FIG. 1 and FIG. 2. FIG. 1 and FIG. 2 illustrate respectively the mechanical loss percentage and the water uptake of plasterboards comprising organosiliconate salt (OF0777) or MPHS (BS94).

U.S. Pat. No. 3,751,926 describes a gypsum cement mixture for erecting wall structure which comprises up to 0.05% of potassium siliconate as hydrophobic additive and more than 5% of blast furnace slag as latently hydraulic material.

SU-A-1409607 discloses a water repellent composition for plaster comprising a sodium methyl siliconate or ethyl-siliconate and bentonite as mineral additive. In practice, such a composition is however able to swell, causing rheological problems of the substrate in the slurry state.

Surprisingly the combination of an organosiliconate with slag and in particular blast furnace slag in appropriate concentration ranges allows the use of a composition for making plaster slurry without the formation of aggregate. In addition, the combination of organosiliconate salt and slag decreases significantly the price of a prefabricated plaster element or a jointing compound while maintaining good water repellency properties and provide good strength.

SUMMARY OF THE INVENTION

Provided herein are the following aspects:

A water repellent composition comprising plaster, slag, organosiliconate salt characterized in that the slag is included in an amount between 1-4 wt % and the organosiliconate is included in an amount between 0.5-2 wt %; wt % based on the plaster weight.

In a preferred embodiment, the concentration of the slag is from 1-2 wt % based on the weight of the plaster. Preferably blast furnace slag is used and it has a specific surface area between 3000 to 5000 $cm^2/g$.

In a most preferred embodiment, the concentration of the organosiliconate salt from 0.5-1 wt % based on the weight of the plaster.

The preferred organosiliconate salt is salt silanetriolate and preferably potassium methyl silanetriolate. In a preferred embodiment, the slag is a blast furnace slag.

The invention is not limited to plasterboards but includes block or powder for jointing compounds.

The invention also concerns a method to provide a prefabricated structural element which comprises mixing of water with water repellent composition respecting a ratio water/solid between 0.6 to 0.8, preferably 0.65 to 0.75, shaping and setting the element.

Another aspect of the invention is the use of the composition for jointing compounds having a water repellent property.

Another aspect of the invention is plasterboard comprising a core obtainable by setting of the water repellent composition.

DETAILED DESCRIPTION

Figure 1:
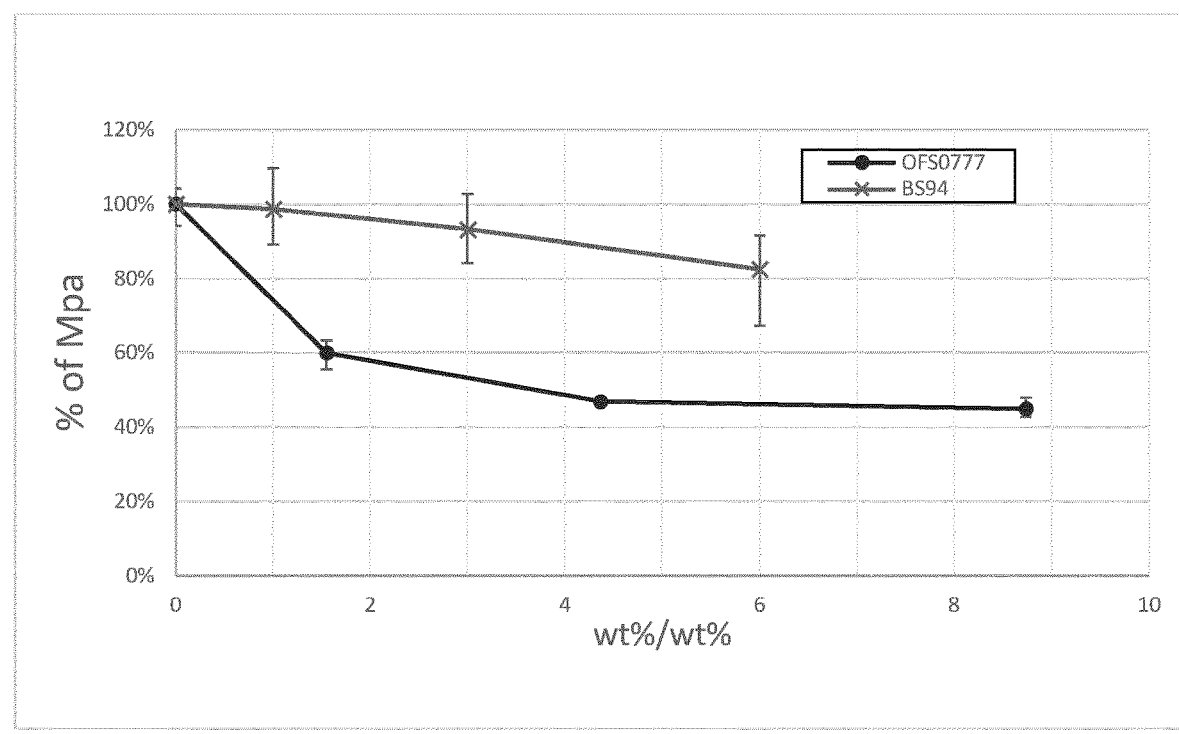
FIG. 1: Mechanical loss percentage measured by three bending test measured according to the norm EN 520+A1: 2009-11 in regards with the weight percentage of methyl siliconate salt (OFS0777) based on weight of the plaster: methyl siliconate in Dow XIAMETER® OFS0777 is diluted but the weight percentage was re-calculated as methylsiliconate was not diluted. The Mechanical loss percentage was also measured for samples comprising MPHS sold under the name of SILRes. BS94 (weight percentage of MPHS based on the weight of the plaster)
Figure 2:
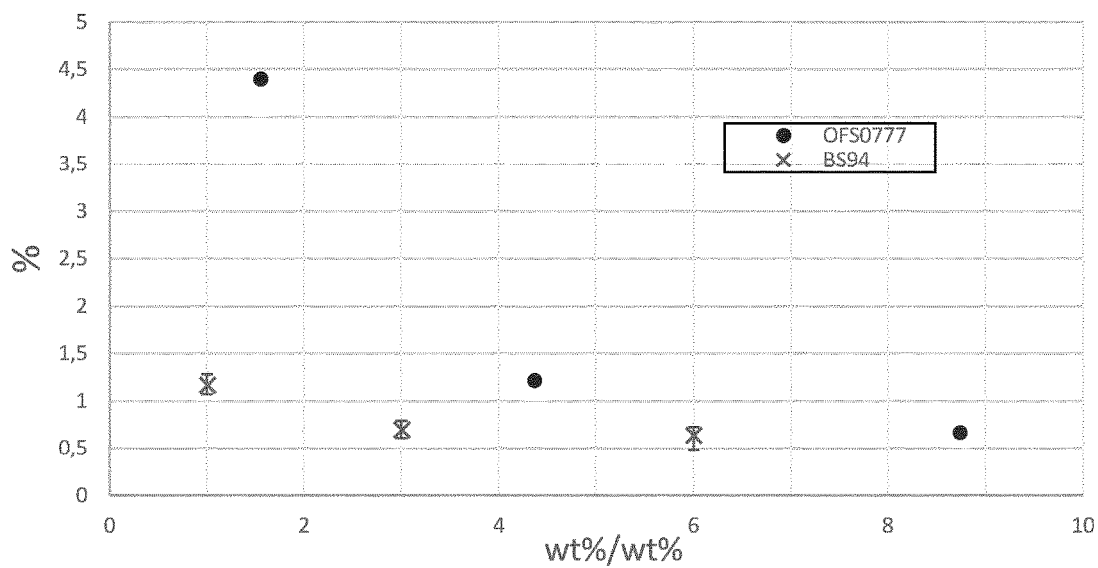
FIG. 2: Percentage of water absorption of boards comprising methyl siliconate or MPHS after 2 h (measured according to the norm EN 520+A1: 2009-11) in regards with the weight percentage of the silicone products (MPHS and methyl siliconate undiluted)

The present invention will be described with respect to particular embodiments.

The term "plaster" (also called "stucco") as used herein and in the generally accepted terminology of the art, refers to a partially dehydrated gypsum of the formula CaSO4× H20, where x can range from 0 to 0.5. The term "plaster" is also referred to herein as "hydratable calcium sulfate". Plaster can be obtained via the calcination of gypsum, i.e. the thermal treatment of gypsum in order to remove (a part of) the combined water. For the preparation of plaster, natural or synthetic gypsum may be used. Natural gypsum may be obtained from gypsum rock or gypsum sand. Synthetic gypsum typically originates from flue gas desulphurization (FGD), phosphoric acid production, boric acid production, citric acid production, titanium dioxide production or any process comprising calcium sulfate production as a by-product. Gypsum obtained from FGD is also known as desulfogypsum (DSG).

Plaster wherein x is 0.5 is known as "calcium sulfate hemihydrate" (HH) or "calcium sulfate semihydrate" (SH), i.e. CaSO4 0.5H2O. Calcium sulfate HH can occur in different crystalline forms; known as α and β. Calcium sulfate HH is also known as "gypsum plaster" or "plaster of Paris".

Plaster wherein x is 0 is known as "calcium sulfate anhydrite" or "anhydrous calcium sulfate". "Calcium sulfate anhydrite III" (AIM) refers to a dehydrated HH with the potential of reversibly absorbing water or vapor. "Calcium sulfate anhydrite II" (Al I) refers to the completely dehydrated calcium sulfate (CaS04). All is formed at higher temperatures and is preferably not used for the preparation of common plasterboard.

Plaster commonly used comprises more than 60 wt % of calcium sulfate hemihydrate.

Organosiliconate salts are monomers or oligomers containing up to 6 Si atoms. The metal is potassium, sodium and lithium. One source of organosiliconate is by-products of polymethylsiloxane. The preferred organosiliconate salt are salt silanetriolate and more preferably potassium methyl silanetriolate also named potassium methyl siliconate.

Industrial or synthetic slag can be used. The preferred slag is a blast furnace slag. Blast furnace slag generally comprises from 30 to 45% by weight of CaO, from about 4 to 17% by weight of MgO, from about 30 to 45% by weight of SiO2 and from about 5 to 15% by weight of Al2O3, typically about 40% by weight of CaO, about 10% by weight of MgO, about 35% by weight of SiO2 and about 12% by weight of Al2O3.

The blast furnace slag is produced as a by-product when manufacturing pig iron in a steel-making blast furnace. Blast furnace slag includes: rock-like slow-cooled blast furnace slag which is a crystalline material obtained by causing molten slag to flow into a cooling yard and applying a progressive cooling process by natural cooling and suitable water sprinkling, and particulate granulated blast furnace slag which is a glass material obtained by applying a rapid cooling process to molten slag, for instance, by spraying pressurized water. It is possible to include either one of these types of slag only, or both types of slag. The blast furnace slag desirably has a specific surface area (as specified according to JIS A 6206) of 3000 to 5000 $cm^2/g$. If the specific surface area of the blast furnace slag is less than 3000 according to JIS A 6206, then the bending strength of the obtained inorganic material board is weak, and if the specific surface area is greater than 5000, then energy is required to crush the slag, leading to increased production of carbon dioxide, which is not desirable from an environmental perspective. The blast furnace slag does not have to be a JIS product and it is also possible to use a non-JIS product.

The water repellent composition may also contain additives that improve the physico-chemical properties of the final product and afford good application conditions. The water repellent composition may thus comprise starch used to increase the adhesion of the paper coating to the plaster, setting accelerator, setting retarder, filler, fluidizing agent, biocide, foaming agent, fibres, fire retardant.

The water repellent composition may be in the form of a powder or a prefabricated structural element such as plasterboard or blocks.

In its powder form, it can be used as jointing compound used by mixing the compound with water respecting a ratio water/solid 0.7 to 1, preferably 0.75 to 0.8.

A plasterboard comprises usually two paper facers to increase the strength of the board which has a thickness between 6 and 25 mm, typically a thickness of 12.5 mm while the block being thicker (more than 30 mm) does not need paper facer.

The term plasterboard as used herein refers to any type of wall, ceiling or floor component of any required size.

The manufacture of plasterboards in particular is known per se.

The plasterboard is formed via a continuous process which consists in plaster with water to form a paste which is continuously deposited between two sheets of paper. The product formed is pressed to obtain the desired thickness, and it is then transported continuously on a conveyor over a distance allowing the paste to achieve a level of hardening sufficient to be able to cut into boards of given length. The boards are then dried in an oven so as to remove the excess water.

The powder components of the paste comprise mainly calcium sulfate hemihydrate (CaSO4.0.5 H2O) and the optional additives described above. The calcined gypsum undergoes a hydration reaction in the presence of water and becomes transformed into calcium sulfate dihydrate (CaSO4.2 H2O: gypsum).

The amount of calcium sulfate hemihydrate used to form the paste varies according to the nature of the board to be manufactured.

Typically, the ratio water/solids (plaster and solids) is between 0.6 and 1. For plasterboards or block the ratio is between 0.6 and 0.8.

The organosiliconate salt is available under a solid form or is diluted in water.

Potassium methyl siliconate is registered under the number 250-807-9 by ECHA (European Chemical Agency).

The density of the board or block is between 0.6-0.9.

The water repellent composition does not preferably contain clays.

EXAMPLES

The following examples are provided for the purpose of illustrating the present invention and by no means are meant and in no way should be interpreted to limit the scope of the present invention.

1. Manufacture of the Prefabricated Structural Element

Plasterboards (30×30×1.5 cm) were produced by the following procedure. 1700 g of plaster were weight. The plaster used comprise more than 80% of calcium sulfate hemihydrate.

The organosiliconate salt used was methylsilanetriolate at 42% (w/w) in an aqueous solution: Dow XIAMETER® OFS-0777 Siliconate.

The ECOCEM blast furnace slag was used and added to the plaster while the siliconate was added in the gauging water. Plaster with slag was then introduced in the gauging water. A ratio water/(plaster+Ecocem) of 0.7 was selected. The mixture is then stirred for 60 seconds in order to obtain a homogeneous paste. The paste is then poured into a silicone mold of 15×300×300 mm³ and let 1 hour for setting in the mold. The formed sample is then removed and let 12 hours at room temperature to allow a complete hydration.

The sample is then cured at 45° C. for 7 days in a ventilated oven. The sample is then removed from the mold.

The reference board (#1) which is considered as plasterboard having a good water resistance is made with 0.7 wt % of MPHS (Wacker-SILRES® BS 94) added to the water prior mixing with the plaster.

Portland cement (Durabat CEM 52,5 Le Havre), combined with siliconate was also tested as comparative sample.

Different concentrations of siliconate, slag, cement, MPHS are expressed in wt % based on the weight of plaster.

The following table summarizes the different tested samples:

|  | 1 | 2 | 3 | 4 | 5 | 6 | 7 |
|---|---|---|---|---|---|---|---|
| wt % of siliconate | 0 | 0.8 | 0.4 | 0.8 | 0.8 | 0.8 | 0.8 |
| wt % of slag | 0 | 0 | 1 | 2 | 4 | 7 | 0 |
| wt % Portland cement | 0 | 0 | 0 | 0 | 0 | 0 | 10 |
| wt % MPHS | 0.7 | 0 | 0 | 0 | 0 | 0 | 0 |

2. Water Absorption Properties

The water absorption properties of the boards were assessed after 2 hours (WU2) according to norm EN-520 (from CSTB).

The water absorption properties were also assessed after 24 hours (WU24).

Figure 3:
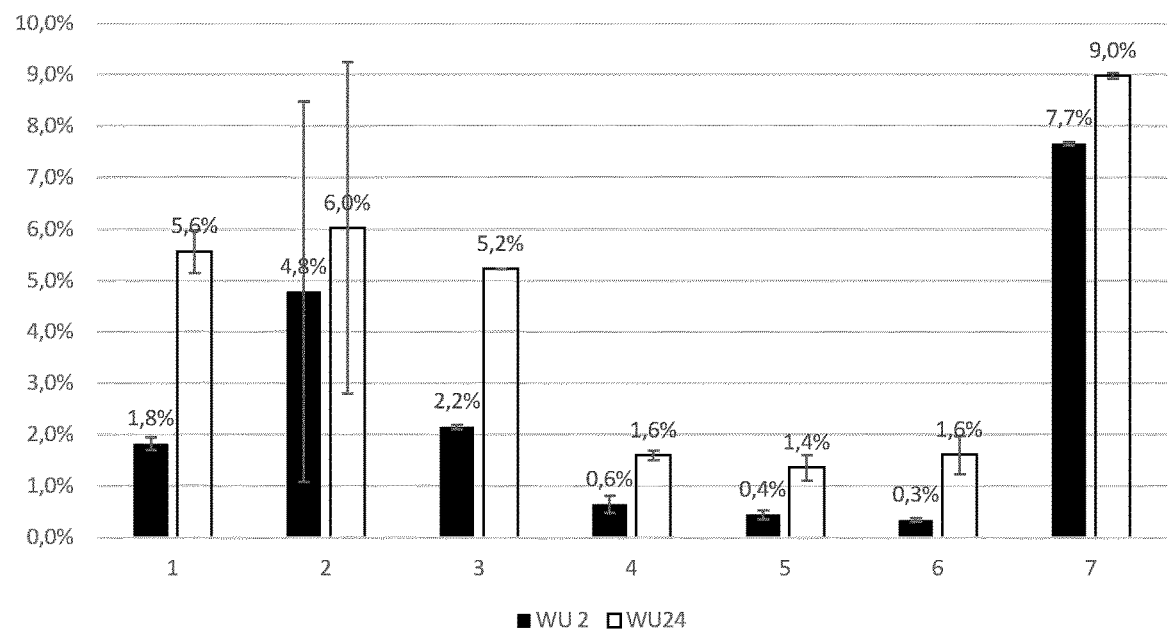
FIG. 3: Percentage of water absorption of boards after 2 (measured according to the norm EN 520+A1: 2009-11) and 24 hours in regards with the tested samples.

FIG. 3 summarizes the results.

The reference is provided by sample #1. The results obtained for the reference are the target results. The board made with Portland cement (#7) give bad results. The board made with 0.8 wt % of organosiliconate salt without slag (#2) provides non reproductive results. A possible explanation is the bad repartition of the organosiliconate in the board. The results are obtained for the boards (#3-6) having a combination of organosiliconate salt with slag are promising.

3. Compressive Strength

The compressive strength of the boards was measured from a 5×5 cm² sample withdrawn from the board, according to standard ASTM C473-12 and are expressed in Mpa.

Figure 4:
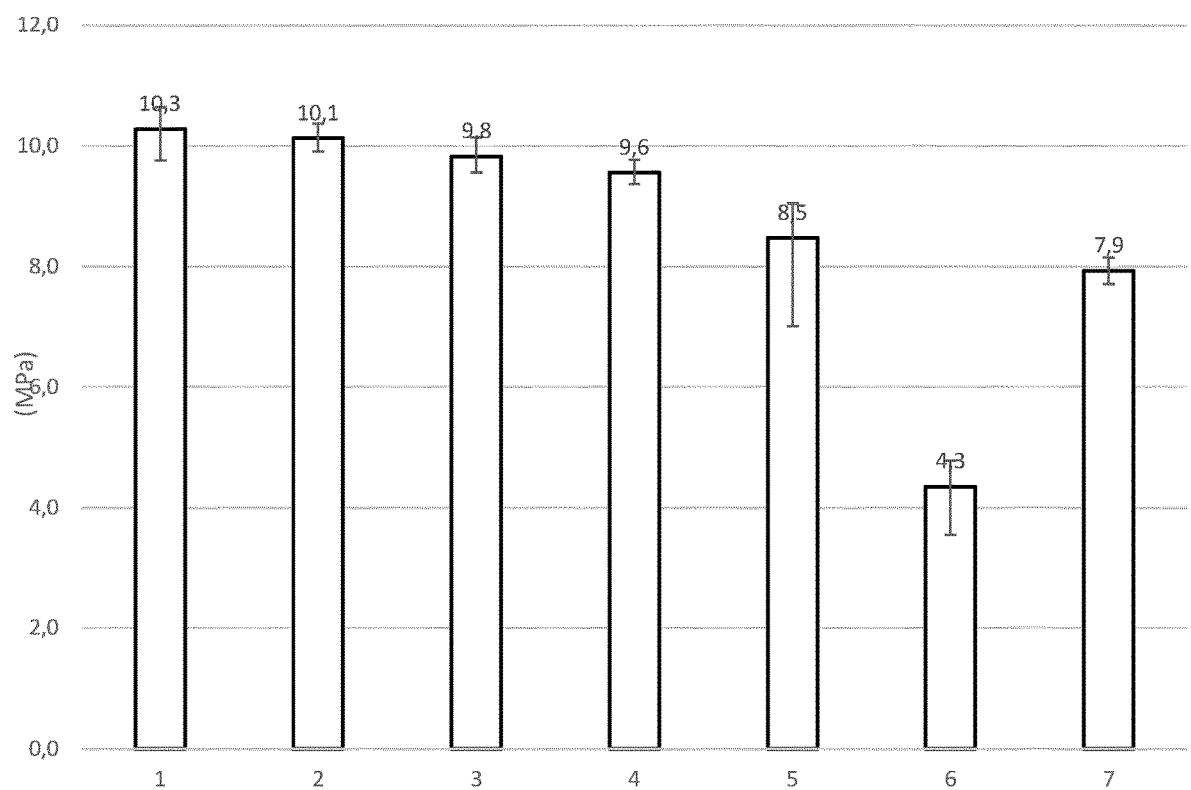
FIG. 4: Stress compression MPa (measured according to the norm ASTM-C473-12) of boards in regards with the tested samples.

FIG. 4 shows the results. The reference is provided by sample #1. A decrease of compressive strength was expected and a loss of 20% was the target. All the boards combining organosiliconate salt and slag provide satisfactory results except for the board containing 0.8 wt % of siliconate salt and 7 wt % of slag (#6). The best compromise seems a concentration of 1-2 wt % of slag.

The invention claimed is:

1. Water repellent composition comprising plaster, slag, organosiliconate salt, wherein the slag is included in an amount between 1-4 wt % and the organosiliconate salt is included in an amount between 0.5-2 wt % based on the plaster weight.

2. The composition according to claim 1, wherein the concentration of the slag is from 1-2 wt % based on the weight of the plaster.

3. The composition according to claim 1, wherein the concentration of the organosiliconate salt is from 0.5-1 wt % based on the weight of the plaster.

4. The composition according to claim 1, wherein the organosiliconate salt is silanetriolate.

5. The composition according to claim 1, wherein the slag is a blast furnace slag.

6. The composition according to claim 1, wherein the blast furnace slag has a specific surface area between 3000 to 5000 cm²/g.

7. The composition according to claim 1, wherein the composition does not comprise clay.

8. The composition according to claim 4, wherein the organosiliconate salt is potassium methyl silanetriolate.

9. A method to provide a prefabricated structural element, which comprises the steps of
mixing water with water repellent composition according to claim 1 respecting a ratio water/solid between 0.6 to 0.8,
shaping, and
setting the element.

10. Method according claim 9, wherein the prefabricated structural element a plasterboard or a block.

11. The method of claim 9, comprising mixing the water with the water repellent composition in a ratio water/solid between 0.65 to 0.75.

12. A jointing compound, comprising the composition according to claim 1.

13. Plasterboard comprising a core obtained by setting of a water repellent composition according to claim 1.

14. Plasterboard according to claim 13, having a core density between 0.6 and 0.9.

* * * * *